(12) United States Patent
Nagahara

(10) Patent No.: US 9,898,241 B2
(45) Date of Patent: Feb. 20, 2018

(54) INFORMATION SHARING SYSTEM, IMAGE PROCESSING APPARATUS, AND IMAGE PROCESSING METHOD

(71) Applicant: Takanori Nagahara, Tokyo (JP)

(72) Inventor: Takanori Nagahara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/674,422

(22) Filed: Mar. 31, 2015

(65) Prior Publication Data

US 2015/0309765 A1    Oct. 29, 2015

(30) Foreign Application Priority Data

Apr. 24, 2014  (JP) .................................. 2014-090213

(51) Int. Cl.
| | |
|---|---|
| *G06F 3/14* | (2006.01) |
| *H04L 12/18* | (2006.01) |
| *H04L 12/58* | (2006.01) |
| *G06F 3/041* | (2006.01) |
| *G06F 3/0488* | (2013.01) |

(Continued)

(52) U.S. Cl.
CPC .......... *G06F 3/1454* (2013.01); *G06F 3/0412* (2013.01); *G06F 3/0416* (2013.01);
(Continued)

(58) Field of Classification Search
CPC .... G06F 3/1454; G06F 3/0488; G06F 3/0416; G06F 3/0412; H04L 12/1822;
(Continued)

(56) References Cited

U.S. PATENT DOCUMENTS 5,430,486 A * 7/1995 Fraser .................. G06T 3/4007
348/426.1
5,990,852 A * 11/1999 Szamrej ............... H04N 19/507
345/2.1
(Continued)

FOREIGN PATENT DOCUMENTS

| JP | 2003-208597 | 7/2003 |
| JP | 2004-192140 | 7/2004 |

OTHER PUBLICATIONS

Charilaos Christopoulos, Athanassios Skodras, Touradj Ebrahimi; "The JPEG2000 Still IMage Coding System: An Overiew"; 2000; IEEE.*

*Primary Examiner* — Mihir K Rayan
(74) *Attorney, Agent, or Firm* — Oblon, McClelland, Maier & Neustadt, L.L.P.

(57) ABSTRACT

An information sharing system includes a first image processing apparatus and a second image processing apparatus connected thereto via a communication network. The first apparatus includes an input unit to input image data, a dividing unit to divide the data into divided image data items, a storage unit to store the divided image data items at respective destinations and output position data items indicating the destinations, a generation unit to generate notification data items each including a corresponding divided image data item and a corresponding position data item, and a transmission unit to sequentially transmit the notification data items to the second apparatus. The second apparatus includes a reception unit to receive the notification data items from the first apparatus and a reproduction unit to reproduce the image data by developing the divided image data items in order of receipt based on the data in the notification data items.

13 Claims, 12 Drawing Sheets

(51) Int. Cl.
*H04L 29/06* (2006.01)
*H04M 3/56* (2006.01)
*H04N 7/15* (2006.01)

(52) U.S. Cl.
CPC ........ *G06F 3/0488* (2013.01); *H04L 12/1813* (2013.01); *H04L 12/1822* (2013.01); *H04L 51/10* (2013.01); *H04L 65/00* (2013.01); *H04M 3/567* (2013.01); *H04N 7/15* (2013.01); *G09G 2350/00* (2013.01); *G09G 2354/00* (2013.01); *G09G 2370/022* (2013.01); *G09G 2370/20* (2013.01)

(58) Field of Classification Search
CPC ..... H04L 51/10; H04L 12/1813; H04L 65/00; H04M 3/567; H04N 7/15; G09G 2370/20; G09G 2354/00; G09G 2370/022; G09G 2350/00
See application file for complete search history.

(56) References Cited

U.S. PATENT DOCUMENTS

| | | | |
|---|---|---|---|
| 6,163,344 A * | 12/2000 | Kawamura | H04N 1/0044 348/220.1 |
| 8,611,215 B2 * | 12/2013 | Katibian | H04L 47/10 370/230 |
| 2007/0008338 A1 * | 1/2007 | Kim | G09G 5/003 345/629 |
| 2007/0058196 A1 | 3/2007 | Nagahara et al. | |
| 2008/0018743 A1 * | 1/2008 | Oh | G06F 3/1423 348/207.1 |
| 2009/0046081 A1 * | 2/2009 | Wang | G09G 5/006 345/204 |
| 2009/0244091 A1 * | 10/2009 | Horio | H04N 7/173 345/619 |
| 2010/0069008 A1 | 3/2010 | Oshima et al. | |
| 2011/0126129 A1 | 5/2011 | Nagahara et al. | |
| 2012/0001832 A1 * | 1/2012 | Braghis | G06F 3/1454 345/2.2 |
| 2012/0002231 A1 | 1/2012 | Nagahara et al. | |
| 2012/0032976 A1 | 2/2012 | Nagahara et al. | |
| 2012/0188579 A1 | 7/2012 | Nagahara et al. | |
| 2012/0206387 A1 | 8/2012 | Omura et al. | |
| 2012/0235934 A1 | 9/2012 | Kawasaki et al. | |
| 2013/0241803 A1 * | 9/2013 | Kobayashi | G06F 3/1454 345/2.2 |
| 2013/0271403 A1 | 10/2013 | Nagahara | |
| 2015/0035782 A1 | 2/2015 | Kawasaki et al. | |
| 2015/0070325 A1 | 3/2015 | Nagahara | |
| 2015/0077369 A1 | 3/2015 | Nagahara et al. | |

* cited by examiner

FIG. 7

```
{
    "version": "1.0",
    "type": "media",
    "header": {
        "method": "add",
        "sequence": 1,
        "from": {"id": "49247021-4f62-4bea-b9eb-505477476b4e"},
        "to": {"id": "463b9d33-a12b-442f-b835-c47ee37400db"},
        "origin": {"id": "49247021-4f62-4bea-b9eb-505477476b4e"}
    }, "body": {
        "images": [
            {
                "url": "http://example.com/8157FAD3-0836-4BFE-BE08-42DBA951A8ED.jp2.p1"
            },
            {
                "url": "http://example.com/8157FAD3-0836-4BFE-BE08-42DBA951A8ED.jp2.p2"
            },
            {
                "url": "http://example.com/8157FAD3-0836-4BFE-BE08-42DBA951A8ED.jp2.p3"
            },
            {
                "url": "http://example.com/8157FAD3-0836-4BFE-BE08-42DBA951A8ED.jp2.p4"
            }
        ],
        "parent": "C7A3AFFE-B82D-4161-9718-2C692BC6EBF6"
    }
}
```

INFORMATION SHARING SYSTEM, IMAGE PROCESSING APPARATUS, AND IMAGE PROCESSING METHOD

CROSS-REFERENCE TO RELATED APPLICATION

This patent application is based on and claims priority pursuant to 35 U.S.C. §119(a) to Japanese Patent Application No. 2014-090213, filed on Apr. 24, 2014, in the Japan Patent Office, the entire disclosure of which is hereby incorporated by reference herein.

BACKGROUND

Technical Field

This disclosure relates to an information sharing system, an image processing apparatus, and an image processing method.

Related Art

So-called electronic information boards have been put on the market as an example of information sharing apparatuses having a touch panel mounted on a flat panel display, such as a liquid crystal display or a plasma display, or a large display having an approximate size of 40 to 60 inches using a projector.

With reference to FIG. 1, the exterior of a typical electronic information board will now be described.

An electronic information board 1000 connected to personal computers (hereinafter referred to as PCs) 1010*a* and 1010*b* is capable of displaying an image 1001 larger than images displayed on respective screens of the PCs 1010*a* and 1010*b*. Such an electronic information board is used for presentations in conferences and meetings in businesses and administrative agencies and for learning purposes in educational institutions, for example. With the touch panel mounted on the electronic information board, a direct touch on a displayed screen is input to the PC to operate the PC.

The electronic information board has functions such as allowing handwriting on the touch panel on the screen, and capturing the screen of the PC that provides application software for the electronic information board and displaying the PC screen on the screen thereof for superimposing handwriting and drawing on the touch panel on the screen.

The electronic information board is also capable of displaying image data transmitted from a remote location on the screen and adding writing to the image data on the screen. In a videoconference using the electronic information board, the image data of the screen displayed on a transmitter apparatus is thus almost simultaneously displayed on a receiver apparatus, promptly displaying any change in the screen even if the communication network therebetween uses a low-speed communication bandwidth, although the quality of the image displayed on the receiver apparatus may be compromised to some extent.

In an image display system that displays maps and so forth, to realize continuous and smooth image scrolling and scaling, an image converter may create multiple sub-image data sets gradually differentiated in pixel size based on the original image data and output each of the sub-image data sets in a multitude of small image data fragments, and the thus-created image data fragments may be stored in an image server on a network and selectively transmitted to a client apparatus as necessary when the client apparatus displays a desired part of the original image.

Alternatively, to transmit optimal data in response to a request for data from the client apparatus, the server may send the client apparatus a message storing server data mode identification information. In response to the server data mode identification information, the client apparatus may send the server information as to layered-coded data according to the processing capacity of the client apparatus, and the server may extract or generate coded data suitable for the client apparatus based on requested data mode identification information and transmit the coded data to the client apparatus. According to this configuration, the server transmits various configurations of data by extracting from the data stored in a storage unit thereof the data suited to the data request from the client apparatus.

SUMMARY

In one embodiment of this disclosure, there is provided an information sharing system that includes, for example, a first image processing apparatus and a second image processing apparatus connected to the first image processing apparatus via a communication network. The first image processing apparatus includes an image input unit to input image data, an image dividing unit to divide the image data to generate divided image data items, an image data storage unit to store the divided image data items at respective storage destinations and output position data items indicating the respective storage destinations of the divided image data items, a notification data generation unit to generate notification data items each including a corresponding divided image data item and a corresponding position data item acquired from the image data storage unit, and a transmission unit to sequentially transmit the notification data items to the second image processing apparatus. The second image processing apparatus includes a reception unit to receive the notification data items from the first image processing apparatus and an image data reproduction unit to reproduce the image data by developing the divided image data items in order of receipt of the divided image data items based on the divided image data items and the position data items included in the notification data items.

In one embodiment of this disclosure, there is provided an improved image processing apparatus that includes, for example, an image input unit to input image data, an image dividing unit to divide the image data to generate divided image data items, an image data storage unit to store the divided image data items at respective storage destinations and output position data items indicating the respective storage destinations of the divided image data items, a notification data generation unit to generate notification data items each including a corresponding divided image data item and a corresponding position data item acquired from the image data storage unit, and a transmission unit to sequentially transmit the notification data items to a counterpart image processing apparatus via a communication network to cause the counterpart image processing apparatus to reproduce the image data by developing the divided image data items in order of receipt of the divided image data items based on the divided image data items and the position data items included in the notification data items.

In one embodiment of this disclosure, there is provided an improved image processing method including inputting image data, dividing the image data to generate divided image data items, storing the divided image data items at respective storage destinations in a memory, outputting position data items indicating respective storage destinations of the divided image data items, generating notification data items each including a corresponding divided image data item and a corresponding position data item acquired from the memory and sequentially transmitting the notification data items to a counterpart image processing apparatus to cause the counterpart image processing apparatus to reproduce the image data by developing the divided image data items in order of receipt of the divided image data items based on the divided image data items and the position data items included in the notification data items.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a diagram illustrating an example of notification data for image data;

Figure 1:
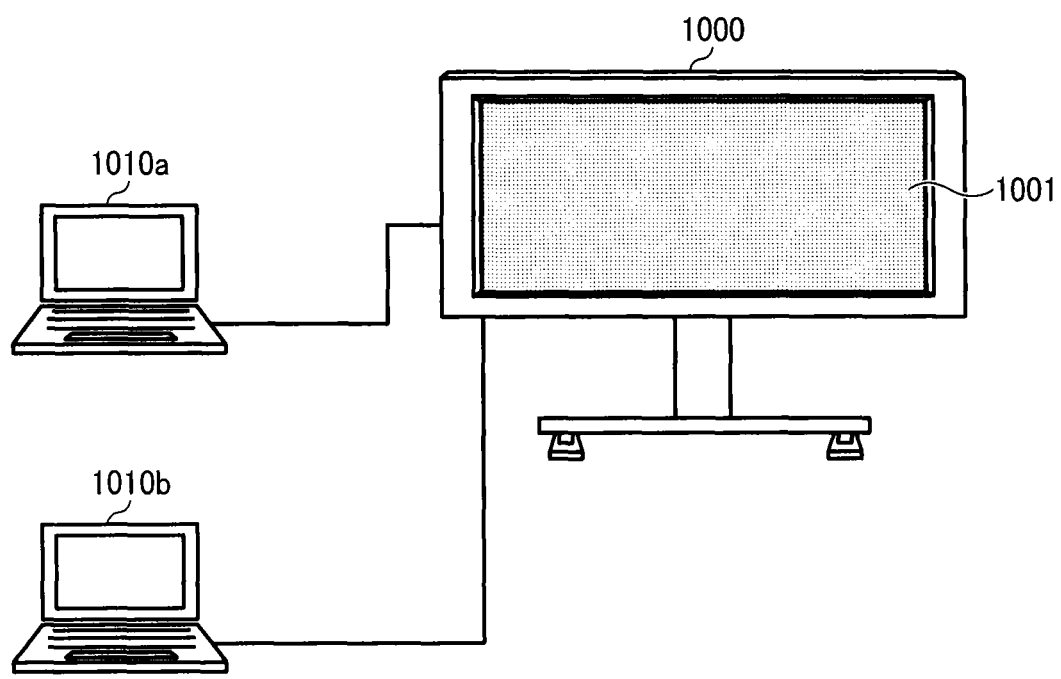
FIG. 1 is a diagram illustrating the exterior of a typical electronic information board.

The accompanying drawings are intended to depict example embodiments of this disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same function, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, wherein like reference numerals designate identical or corresponding parts throughout the several views, embodiments of this disclosure will be described. According to embodiments of this disclosure, in a videoconference in which a transmitter apparatus at one site transmits a screen image thereof and a receiver apparatus at another site displays the screen image, the transmitter apparatus generates high-quality, high-resolution images in the joint photographic experts group (JPEG) 2000 format and dividedly stores the images irrespective of the status of the receiver apparatus, and the receiver apparatus acquires and combines divided image data items from uniform resource locators (URLs) included in notification data items in accordance with the status of the receiver apparatus to progressively display the image.

Figure 2:
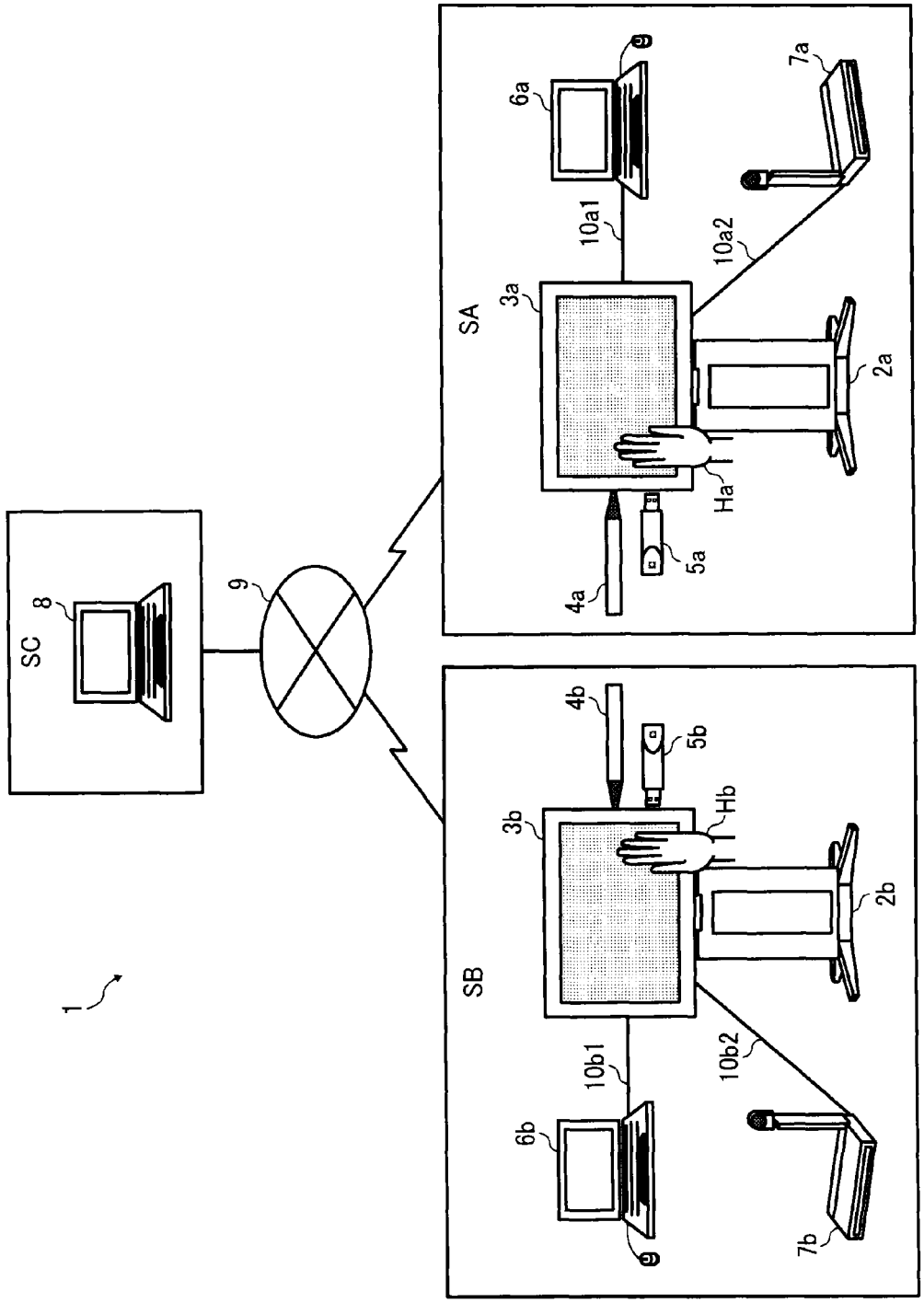
FIG. 2 is an overall configuration diagram of an information sharing system according to a first embodiment of this disclosure.

A configuration of an information sharing system according to the first embodiment will first be described with reference to FIG. 2 illustrating an overall configuration of the information sharing system including image processing apparatuses according to the first embodiment.

The information sharing system according to the present embodiment uses, for example, a plurality of electronic blackboards (i.e., image processing apparatuses) connected to a communication network.

As illustrated in FIG. 2, an information sharing system 1 includes a plurality of apparatuses and devices installed at a first site SA, a second site SB, and a third site SC. At the first site SA, an electronic blackboard 2a including a display 3a, an electronic pen 4a, a universal serial bus (USB) memory 5a, a laptop personal computer (PC) 6a, and a tele/video conference terminal 7a are provided. At the second site SB, an electronic blackboard 2b including a display 3b, an electronic pen 4b, a USB memory 5b, a laptop PC 6b, and a tele/video conference terminal 7b are provided. At the third site SC, a PC 8 is provided. The electronic blackboards 2a and 2b and the PC 8 are communicably connected via a communication network 9.

For ease of illustration, FIG. 2 illustrates two electronic blackboards 2a and 2b, the corresponding two electronic pens 4a and 4b, and two sets of other components. The information sharing system 1, however, may include three or more sets of electronic blackboards, electronic pens, and other components.

At the first site SA, when the electronic pen 4a is operated to touch the display 3a with a tip or bottom thereof, the display 3a generates an event. The electronic blackboard 2a displays on the display 3a an image rendered in accordance with the event generated by the electronic pen 4a. The image displayed on the display 3a may be changed based on a gesture, such as zooming in, zooming out, or page turning, generated as the event by a human hand Ha or the like in place of the electronic pen 4a.

When connected to the USB memory 5a, the electronic blackboard 2a reads an electronic file, such as a portable document format (PDF) file, from the USB memory 5a or records an electronic file in the USB memory 5a.

The electronic blackboard 2a is connected to the laptop PC 6a via a cable 10a1 that allows communication based on a connection standard such as DisplayPort, digital visual interface (DVI), high-definition multimedia interface (HDMI) (registered trademark), or video graphics array (VGA). The electronic blackboard 2a generates an event in response to a touch on the display 3a and transmits event data indicating the event to the laptop PC 6a similarly to an event generated with an input device such as a mouse or keyboard.

The electronic blackboard 2a is further connected to the tele/video conference terminal 7a via a cable 10a2 that allows communication based on the above-described connection standard. The laptop PC 6a and the tele/video conference terminal 7a may communicate with the electronic blackboard 2a based on wireless communication conforming to a wireless communication protocol such as Bluetooth (registered trademark).

At the second site SB where the electronic blackboard 2b is installed, the electronic blackboard 2b including the display 3b, the electronic pen 4b, the USB memory 5b, the laptop PC 6b, the tele/video conference terminal 7b, and cables 10b1 and 10b2 are employed similarly to the first site SA. The image displayed on the display 3b may be changed based on the event generated in the electronic blackboard 2b in accordance with an operation performed with a human hand Hb or the like.

With the above-described configuration, the image rendered on the display 3a of the electronic blackboard 2a installed at the first site SA is also displayed on the display 3b of the electronic blackboard 2b installed at the second site SB, and the image rendered on the display 3b of the electronic blackboard 2b installed at the second site SB is also displayed on the display 3a of the electronic blackboard 2a installed at the first site SA. The information sharing system 1, in which a remote sharing process is thus performed between the two remote sites to share the same image, is convenient for use in a conference or the like between remote sites.

In the following description, the electronic blackboards 2a and 2b, the displays 3a and 3b, the electronic pens 4a and 4b, the USB memories 5a and 5b, the laptop PCs 6a and 6b, the tele/video conference terminals 7a and 7b, the hands Ha and Hb, and the cables 10a1, 10a2, 10b1, and 10b2 will be collectively referred to as the electronic blackboards 2, the displays 3, the electronic pens 4, the USB memories 5, the laptop PCs 6, the tele/video conference terminals 7, the hands H, and the cables 10, respectively, where distinction therebetween is unnecessary.

Although the present embodiment uses the electronic blackboard 2 as an example of the image processing apparatus, the present disclosure is not limited thereto. Thus, the image processing apparatus may be a digital signage, a telestrator used in fields such as sports news and weathercast, or a telemedicine (telediagnosis) apparatus, for example.

Further, although the present embodiment uses the laptop PC 6 as an example of an information processing terminal, the present disclosure is not limited thereto. Thus, the processing terminal may be a terminal capable of supplying an image frame, such as a desktop PC, a tablet PC, a personal digital assistant (PDA), a digital video camera, a digital camera, or a game apparatus, for example.

Furthermore, although the present embodiment uses the USB memory 5 as an example of a recording medium, the present disclosure is not limited thereto. Thus, the recording medium may be a different type of recording medium such as a secure digital (SD) card, for example.

The communication network 9 may be the Internet, a local area network (LAN), or a mobile phone communication network, for example.

A hardware configuration of the electronic blackboard 2 according to the present embodiment will now be described with reference to FIG. 3.

Figure 3:
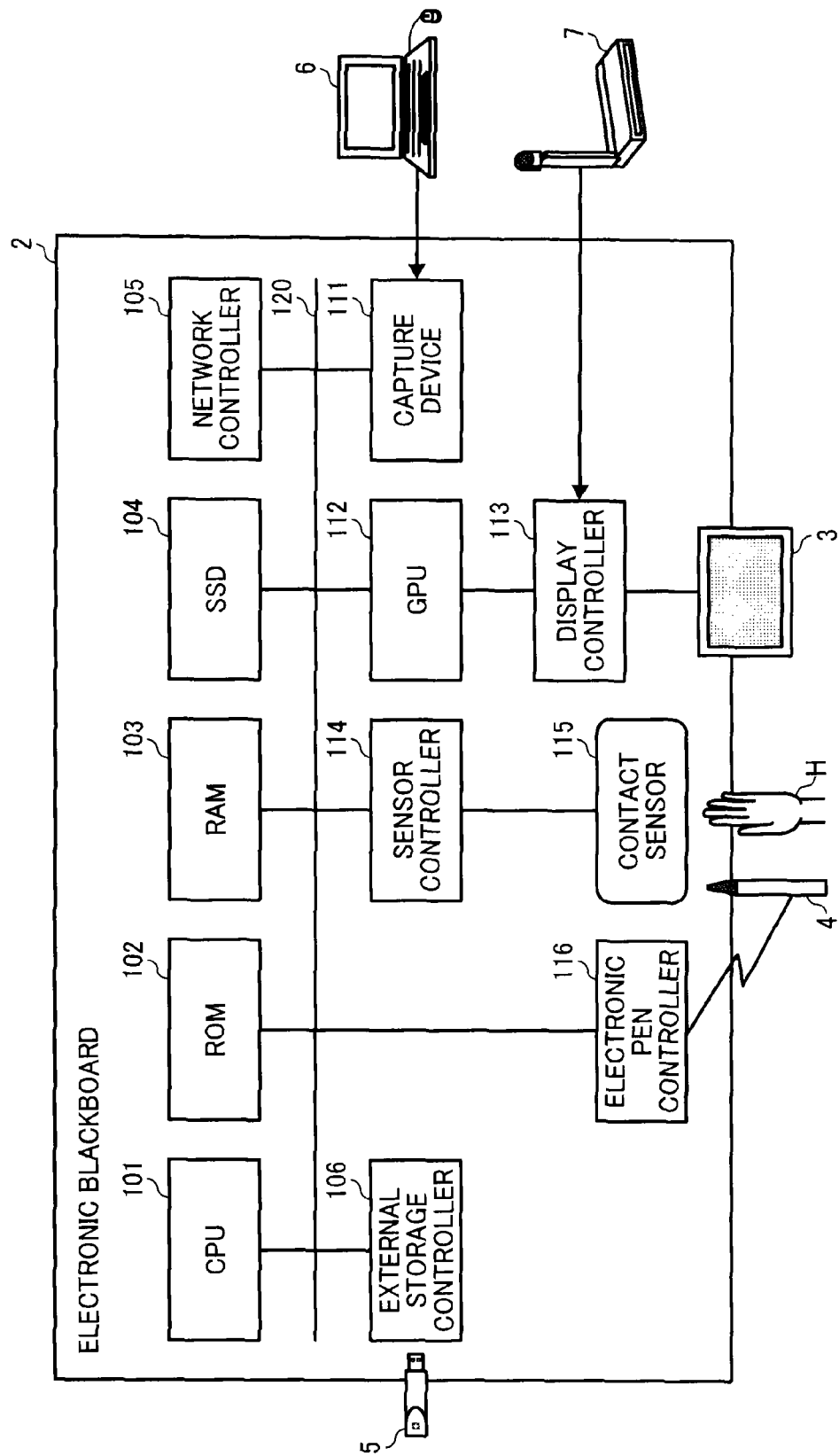
FIG. 3 is a block diagram illustrating a hardware configuration of electronic blackboards in the information sharing system illustrated in FIG. 2.

FIG. 3 is a block diagram illustrating a hardware configuration of the electronic blackboards 2 illustrated in FIG. 2. As illustrated in FIG. 3, each of the electronic blackboards 2 includes a central processing unit (CPU) 101, a read-only memory (ROM) 102, a random access memory (RAM) 103, a solid state drive (SSD) 104, a network controller 105, an external storage controller 106, a capture device 111, a graphics processing unit (GPU) 112, a display controller 113, a sensor controller 114, a contact sensor 115, an electronic pen controller 116, and bus lines 120.

The CPU 101 controls overall operation of the electronic blackboard 2. The ROM 102 stores a program for driving the CPU 101, such as an initial program loader (IPL). The RAM 103 is used as a work area for the CPU 101. The SSD 104 stores a variety of data including a program for the electronic blackboard 2. The network controller 105 controls the communication with the communication network 9. The external storage controller 106 controls the communication with the USB memory 5.

The capture device 111 acquires JPEG 2000-formatted video information from the laptop PC 6 as a still or moving image. The GPU 112 is specialized in processing graphics. The display controller 113 controls screen display to output an image from the GPU 112 to the display 3 or the tele/video conference terminal 7.

The sensor controller 114 controls the processing of the contact sensor 115 that detects a touch on the display 3 by the electronic pen 4 or the hand H. The contact sensor 115 inputs and detects coordinates based on an infrared blocking method using two light-receiving devices installed on opposed ends on the upper side of the display 3 to emit infrared rays parallel to the display 3 and receive light reflected on the same light path as that of the infrared rays by reflectors provided around the display 3. The contact sensor 115 outputs to the sensor controller 114 the identifications (IDs) of the infrared rays emitted by the two light-receiving devices and blocked by an object, and the sensor controller 114 identifies the coordinate position contacted by the object. IDs described in the following are all examples of identification information.

The contact sensor 115 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display.

The electronic pen controller 116 communicates with the electronic pen 4 to detect a touch on the display 3 by the tip or bottom of the electronic pen 4. The electronic pen controller 116 may also detect a touch by another part of the electronic pen 4, such as a part held by a hand, as well as the tip or bottom of the electronic pen 4.

The bus lines 120, such as address buses and data buses, electrically connect the CPU 101, the ROM 102, the RAM 103, the SSD 104, the network controller 105, the external storage controller 106, the capture device 111, the GPU 112, and the sensor controller 114, as illustrated in FIG. 3.

The program used for the electronic blackboard 2 may be recorded in a computer-readable recording medium such as a compact disc (CD)-ROM.

A functional configuration of the electronic blackboard 2 will now be described with reference to FIGS. 4 to 6. An overall functional configuration of the electronic blackboard 2 will first be described with reference to FIG. 4.

Figure 4:
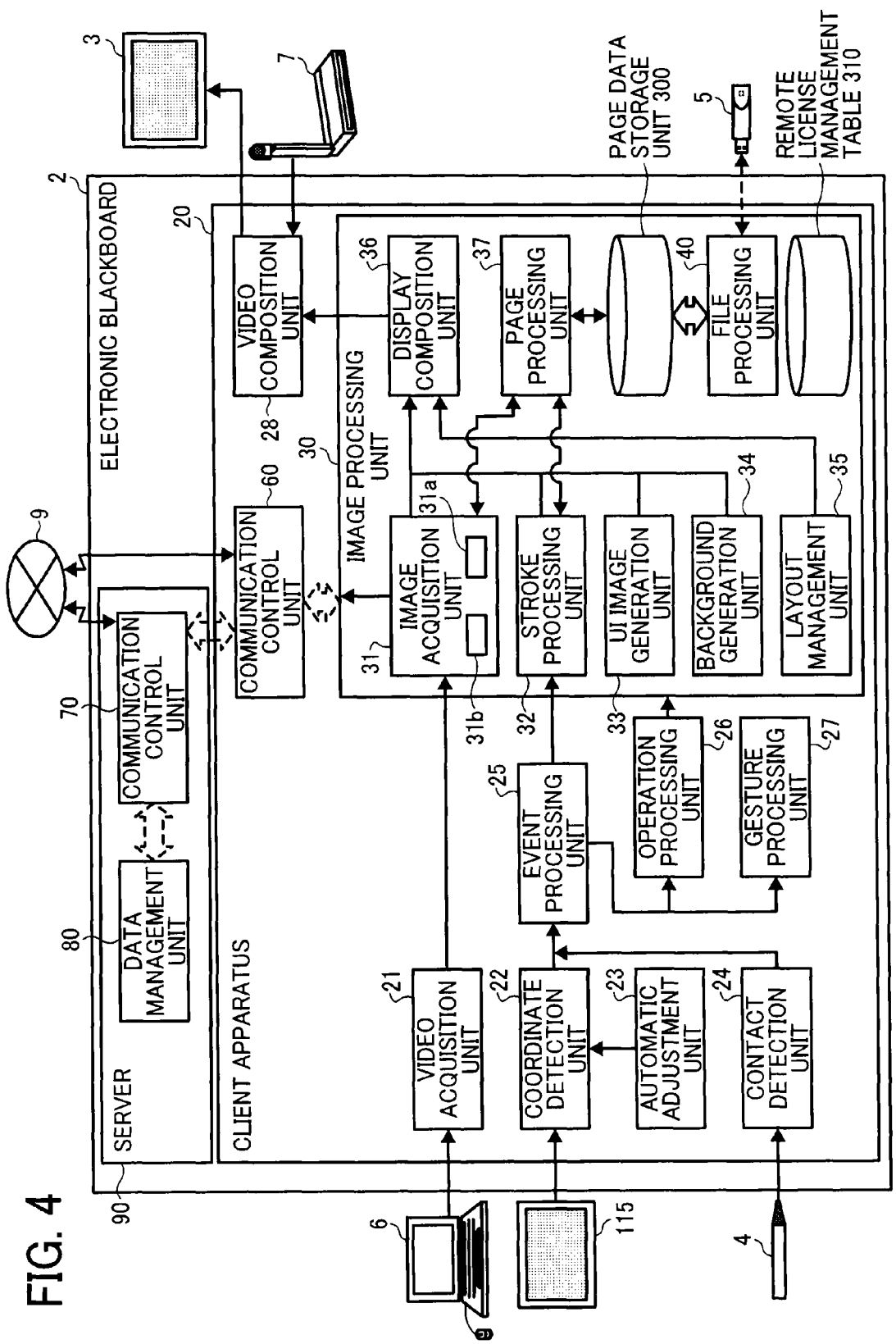
FIG. 4 is a functional block diagram of the electronic blackboards in the information sharing system illustrated in FIG. 2.

FIG. 4 is a functional block diagram of the electronic blackboards 2 illustrated in FIG. 2. Each of the electronic blackboards 2 realizes the functional blocks illustrated in FIG. 4 by executing the program read from the ROM 102 by the CPU 101. The electronic blackboard 2 is divided into a client apparatus 20 and a server 90. That is, a client apparatus 20 and a server 90 are included in the housing of a single electronic blackboard 2. In FIGS. 4 and 5, broken arrows indicate data flows.

A functional configuration of the client apparatus 20 will be described with reference to FIGS. 4 to 6.

The client apparatus 20 includes a video acquisition unit 21, a coordinate detection unit 22, an automatic adjustment unit 23, a contact detection unit 24, an event processing unit 25, an operation processing unit 26, a gesture processing unit 27, a video composition unit 28, an image processing unit 30, and a communication control unit 60.

The video acquisition unit 21 acquires video output from a video output apparatus such as the laptop PC 6 connected to the cable 10. The video acquisition unit 21 receives and analyses an image signal from the video output apparatus (e.g., the laptop PC 6) to obtain image data, such as the resolution of the image frame corresponding to the display image of the video output apparatus formed by the image signal and the update frequency of the image frame, and outputs the image data to an image acquisition unit 31 of the image processing unit 30.

The coordinate detection unit 22 detects the coordinate position of the event generated by the touch on the display 3 and the area of contact of the touch. The automatic adjustment unit 23 is activated at start-up of the electronic blackboard 2 to automatically adjust the coordinate detection unit 22. The contact detection unit 24 detects the event generated by the touch (e.g., touch on the display 3 by the tip or bottom of the electronic pen 4).

The event processing unit 25 categorizes the event as stroke rendering, a user interface (UI) operation, or a gesture operation based on the coordinate position of the event detected by the coordinate detection unit 22 and the result of detection obtained by the contact detection unit 24. Herein, the stroke rendering is rendering performed with the electronic pen 4 or the hand H. The UI operation is an operation performed on a UI image IA illustrated in FIG. 6 to set, for example, the color or width of a line rendered with the electronic pen 4. The gesture operation is an operation representing a gesture. For example, a gesture of moving the hand H while in contact with the display 3 corresponds to an operation of zooming in or out the image, changing the display area, or switching the page.

If the event processing unit 25 identifies the event as a UI operation, the operation processing unit 26 executes an operation in accordance with a UI element corresponding to the generated event. The UI element may be a button, a list, a check box, or a text box, for example. If the event processing unit 25 identifies the event as a gesture operation, the gesture processing unit 27 executes an operation corresponding to the gesture operation.

Figure 6:
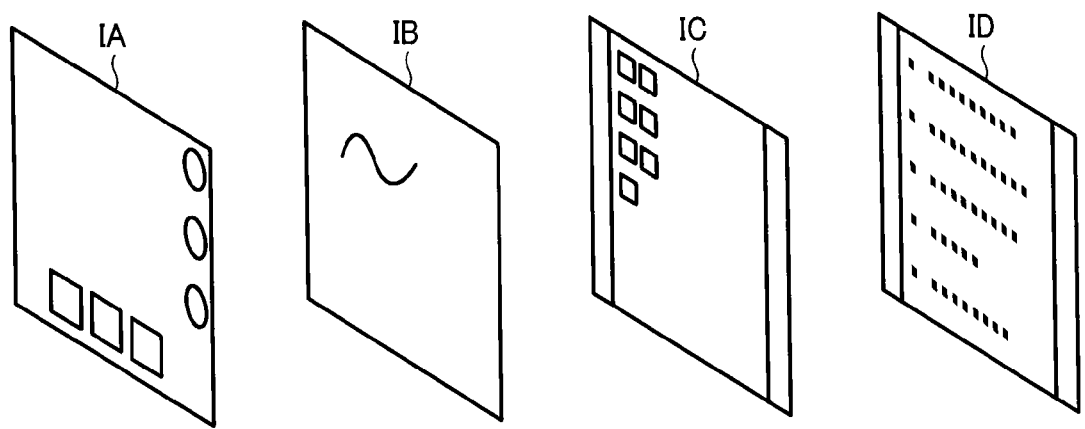
FIG. 6 is a diagram illustrating layers of images.

The image processing unit 30 performs processes such as combining layers of images illustrated in FIG. 6. The image processing unit 30 includes an image acquisition unit 31, a stroke processing unit 32, a UI image generation unit 33, a background generation unit 34, a layout management unit 35, a display composition unit 36, a page processing unit 37, a file processing unit 40, a page data storage unit 300, and a remote license management table 310.

The image acquisition unit 31 acquires frames of the video acquired by the video acquisition unit 21 as images. Each of the images corresponds to an output image IC illustrated in FIG. 6 output from the video output apparatus (e.g., the laptop PC 6).

The image acquisition unit 31 includes an image dividing unit 31a and a notification data generation unit 31b. The image dividing unit 31a divides the image data to generate divided image data items, stores the divided image data items in an image data management unit 830 of the server 90 illustrated in FIG. 5, and outputs position data items indicating respective storage destinations of the divided image data items. The notification data generation unit 31b generates notification data items each including the corresponding divided image data item and the corresponding positon data item acquired from the image data management unit 830.

The stroke processing unit 32 illustrated in FIG. 4 renders an image or removes or emits the rendered image based on, for example, the touch of the tip or bottom of the electronic pen 4 or the touch of the hand H determined to be a stroke by the event processing unit 25. The image rendered by the stroke corresponds to a stroke image IB illustrated in FIG. 6. The result of image rendering, removal, or editing based on the stroke or the like is stored in an operation data storage unit 840 of the server 90 illustrated in FIG. 5 as operation data.

The UI image generation unit 33 generates the UI image IA illustrated in FIG. 6 previously set in the electronic blackboard 2. The background generation unit 34 generates a background image ID illustrated in FIG. 6 to be displayed on the display 3. The background image ID has a pattern such as a plain pattern or a grid pattern.

The layout management unit 35 manages layout data representing the layout of the images output from the image acquisition unit 31, the stroke processing unit 32, the UI image generation unit 33, and the background generation unit 34 to be laid out by the display composition unit 36. With this configuration, the layout management unit 35 instructs the display composition unit 36 as to the position in the UI image IA and the background image ID at which the output image IC and the stroke image IB should be displayed or should not be displayed.

The display composition unit 36 lays out the images output from the image acquisition unit 31, the stroke processing unit 32, the UI image generation unit 33, and the background generation unit 34 based on the layout data output from the layout management unit 35.

The page processing unit 37 records the background image ID and the stroke image IB as a single page. The page processing unit 37 further displays the recorded page, edits the stroke, and deletes or duplicates the page.

The display composition unit 36 combines the output image IC from the image acquisition unit 31, the stroke image IB from the stroke processing unit 32, the UI image IA from the UI image generation unit 33, and the background image ID from the background generation unit 34 in accordance with the layout specified by the layout management unit 35. Consequently, layers of the UI image IA, the stroke image IB, the output image IC, and the background image ID are superimposed to be visible to the human eye, as illustrated in FIG. 6.

The display composition unit 36 may perform image composition by changing the output image IC and the background image ID illustrated in FIG. 6. For example, if the cable 10 connecting the electronic blackboard 2 and the laptop PC 6 is unplugged, the display composition unit 36 may exclude the output image IC from the image composition in accordance with the specification by the layout management unit 35. The display composition unit 36 further performs processes such as zooming in or out the displayed image and moving the display area.

The video composition unit 28 displays the image composed by the display composition unit 36 on the video output apparatus (e.g., the laptop PC 6) as video. The video composition unit 28 also combines video transmitted from another video output apparatus (e.g., the tele/video conference terminal 7) with the video transmitted from the video output apparatus (e.g., the laptop PC 6), thereby realizing picture-in-picture. The video composition unit 28 further performs switching for causing the picture-in-picture video displayed in a part of the display 3 to be displayed on the entire display 3.

Figure 5:
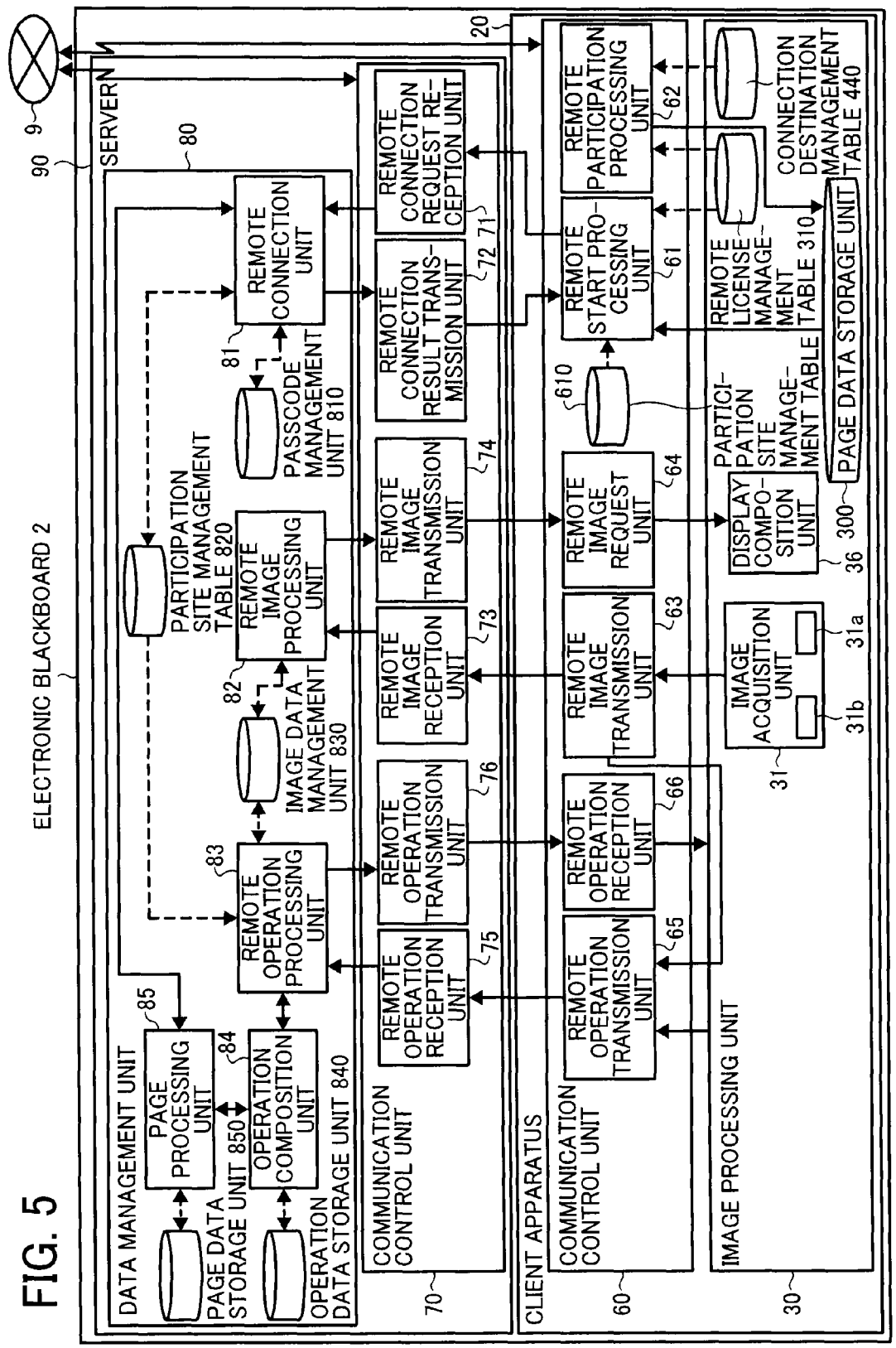
FIG. 5 is a more detailed version of the functional block diagram illustrated in FIG. 4.

The video composition unit 28 displays on the display 3 the image data (i.e., the output image IC) transmitted via a remote image processing unit 82 and a remote image transmission unit 74 of the server 90 and a remote image request unit 64 and the display composition unit 36 of the client apparatus 20, as illustrated in FIG. 5.

With the above-described configuration, the present embodiment provides the electronic blackboard 2 integrating a transmitter and a receiver.

A functional configuration of the communication control unit 60 will now be described with reference to FIG. 5.

To control communication with another electronic blackboard 2 installed at a different site via the communication network 9 and communication with a communication control unit 70 of the server 90 in the same electronic blackboard 2, the communication control unit 60 includes a remote start processing unit 61, a remote participation processing unit 62, a remote image transmission unit 63, a remote image request unit 64, a remote operation transmission unit 65, a remote operation reception unit 66, and a participation site management table 610.

The remote start processing unit 61 requests the server 90 in the same electronic blackboard 2 to newly start the remote sharing process, and receives the result of the request from the server 90. In this case, the remote start processing unit 61 refers to the remote license management table 310. If license data including a product ID, a license ID, and an expiration date is managed in the remote license management table 310, the remote start processing unit 61 is allowed to request start of the remote sharing process. If the license data is not managed in the remote license management table 310, however, the remote start processing unit 61 is not allowed to request start of the remote sharing process.

If the remote sharing process has already been started by another electronic blackboard 2 serving as a host apparatus, the remote participation processing unit 62 sends, via the communication network 9, a request for participation in the remote sharing process to a remote connection request reception unit 71 of the server 90 in the other electronic blackboard 2. In this case, the remote participation processing unit 62 refers to the remote license management table 310 similarly to the remote start processing unit 61 requesting for the start of the remote sharing process. To participate in the already started remote sharing process, the remote participation processing unit 62 refers to a connection destination management table 440 to acquire an interne protocol (IP) address of the other electronic blackboard 2 to which the participation is requested. The IP address of the other electronic blackboard 2 to which the participation is requested may be input instead of the reference to the connection destination management table 440 by the remote participation processing unit 62.

The remote image transmission unit 63 transmits to the server 90 the output image IC transmitted from the video acquisition unit 21 via the image acquisition unit 31. The remote image request unit 64 receives, via the server 90, image data transmitted from a video output apparatus connected to another electronic blackboard 2, and outputs the image data to the display composition unit 36, thereby enabling the remote sharing process.

The remote operation transmission unit 65 transmits to the server 90 a variety of operation data necessary for the remote sharing process. The variety of operation data includes, for example, data related to addition, removal, and editing (e.g., zoom-in, zoom-out, and movement) of strokes, recording, generation, duplication, and removal of page data, and switching of the displayed page. The remote operation reception unit 66 receives, via the server 90, operation data input to another electronic blackboard 2, and outputs the operation data to the image processing unit 30 to perform the remote sharing process.

A functional configuration of the server 90 will now be described with reference to FIG. 5.

Each electronic blackboard 2 includes a server 90, and thus is capable of functioning as a server. The server 90 includes a communication control unit 70 and a data management unit 80 that manages data such as the operation data and the image data.

A functional configuration of the communication control unit 70 will now be described with reference to FIG. 5.

The communication control unit 70 controls communication with the communication control unit 60 of the client apparatus 20 in the same electronic blackboard 2 and communication with the communication control unit 60 of the client apparatus 20 in another electronic blackboard 2 via the communication network 9.

More specifically, the communication control unit 70 includes a remote connection request reception unit 71, a remote connection result transmission unit 72, a remote image reception unit 73, a remote image transmission unit 74, a remote operation reception unit 75, and a remote operation transmission unit 76.

The remote connection request reception unit 71 receives the request from the remote start processing unit 61 for the start of the remote sharing process and the request from the remote participation processing unit 62 for participation in the remote sharing process. The remote connection result transmission unit 72 transmits the result of the request start of the remote sharing process to the remote start processing unit 61 and the result of the request for participation in the remote sharing process to the remote participation processing unit 62.

The remote image reception unit 73 receives the image data (i.e., the data of the output image IC) from the remote image transmission unit 63, and transmits the image data to the remote image processing unit 82. The remote image transmission unit 74 receives image data from the remote image processing unit 82, and transmits the image data to the remote image request unit 64.

The remote operation reception unit 75 receives the operation data, (i.e., the data of the stroke image IB and so forth) from the remote operation transmission unit 65, and transmits the operation data to a remote operation processing unit 83. The remote operation transmission unit 76 receives operation data from the remote operation processing unit 83, and transmits the operation data to the remote operation reception unit 66.

A functional configuration of the data management unit 80 will now be described with reference to FIG. 5.

The data management unit 80 includes a remote connection unit 81, a remote image processing unit 82, a remote operation processing unit 83, an operation composition unit 84, a page processing unit 85, a passcode management unit 810, a participation site management table 820, an image data management unit 830, an operation data storage unit 840, and a page data storage unit 850.

The remote connection unit 81 starts and completes the remote sharing process. The remote connection unit 81 also checks the presence of the license and the validity period of the license based on the license data which the remote connection request reception unit 71 has received together with the request for the start of the remote sharing process from the remote start processing unit 61 or the license data which the remote connection request reception unit 71 has received together with the request for participation in the remote sharing process from the remote participation processing unit 62. The remote connection unit 81 further checks whether the number of participation requests from electronic blackboards 2 installed at other sites as participant apparatuses has exceeded a predetermined acceptable number of participant apparatuses.

Further, the remote connection unit 81 determines whether or not a passcode transmitted from an electronic blackboard 2 located at another site when the electronic blackboard 2 has requested for participation in the remote sharing process is the same as the passcode managed by the passcode management unit 810. If the passcodes are the same, the remote connection unit 81 authorizes the electronic blackboard 2 to participate in the remote sharing process. The passcode is issued by the remote connection unit 81 when a new remote sharing process is started, and is transmitted to a user of an electronic blackboard 2 serving as a participant apparatus that intends to participate in the remote sharing process (hereinafter referred to as the participant electronic blackboard 2) by a user of an electronic blackboard 2 serving as a host apparatus (hereinafter referred to as the host electronic blackboard 2) via phone or electronic mail, for example. Then, the user of the participant electronic blackboard 2 inputs the passcode to the electronic blackboard 2 to request participation, and is authorized to participate in the remote sharing process. Alternatively, only the status of the license may be checked without passcode check to give user convenience precedence over security.

The remote connection unit 81 further stores, in the participation site management table 820 of the server 90, participation site data included in the participation request transmitted via the communication network 9 from the remote participation processing unit 62 of the participant electronic blackboard 2 located at another site. In the host electronic blackboard 2, therefore, the same participation site management table is managed by the client apparatus 20 and the server 90. The remote connection unit 81 further reads remote site data stored in the participation site management table 820 and transmits the remote site data to the remote start processing unit 61 of the participant electronic blackboard 2 via the communication network 9.

The remote image processing unit 82 receives divided image data items of the image data (i.e., the output image IC) transmitted from each of the video output apparatuses (e.g., the laptop PCs 6) connected to the client apparatuses 20 of the electronic blackboards 2 participating in the remote sharing process (including the client apparatus 20 of the host electronic blackboard 2 corresponding the remote image processing unit 82).

Herein, each of the client apparatuses 20 divides the image data acquired by the video output apparatus into divided image data items and transmits the divided image data items to the server 90.

As to control of coding order, the JPEG 2000 standard defines five types of progression order combining resolution level, precinct (i.e., position), layer, and component (i.e., color component). Typical of the five orders are layer-resolution level-component-position progression (LRCP) and resolution level-layer-component-position progression (RLCP).

Progressive decoding gradually improving the image quality with a constant resolution is possible by sequentially decoding a data string coded in LRCP order. Contrastively, progressive decoding gradually increasing the resolution with constant image quality is possible by sequentially decoding a data string coded in RLCP order.

In the data communication of the present embodiment, wavelet-converted data is held in a code string in the above-described LRCP or RLCP order, for example. Further, in the present embodiment, a control information transmission process is executed between the server 90 and the client apparatus 20 prior to the transmission of the coded data. Specifically, during information exchange based on real-time streaming protocol (RTSP), the server 90 sends the client apparatus 20 the information as to which one of the LRCP order and the RLCP order is adopted in the data held by the server 90 and the information as to the type of coding process performed on other coded data.

Herein, the image data may be divided based on a division size, layers in the JPEG 2000 standard, or the resolution. If the image data is divided based on the division size, the image data may be divided in units of 10 KB, for example. Further, the division size may be changed depending on transmission mode.

For example, the division size may be set to 100 KB if a high bandwidth mode (1 Mbps or higher) is selected as the communication bandwidth between the sites, and 50 KB if an intermediate bandwidth mode (500 kbps or higher and lower than 1 Mbps) is selected. Further, the division size may be set to 25 KB if a low bandwidth mode (200 kbps or higher and lower than 500 kbps) is selected, and 10 KB if an ultralow bandwidth mode (lower than 200 kbps) is selected.

According to the JPEG 2000 standard, the information gradually shifts from rough information of the entire screen to finer information, allowing the image data to be divided into 8×8-pixel blocks. Therefore, blocks of image data not exceeding a specified division size may be defined as one divided image data item, and the position of the blocks may be indicated by the position data item.

In accordance with a request from the remote image request unit 64 of the client apparatus 20, the remote image processing unit 82 transmits the image data corresponding to the position data item included in the request via the communication control unit 70 (specifically, the remote image transmission unit 74). The position data item, which may be described in URL (request for comments (RFC) 1738), indicates the location at which the corresponding divided image data item is stored. The position data item also indicates the precinct in the JPEG 2000 standard (i.e., the address of the divided image data item in a divided image file).

The remote operation processing unit 83 receives the foregoing variety of operation data such as the stroke images IB rendered by the client apparatuses 20 of the electronic blackboards 2 participating in the remote sharing process (including the client apparatus 20 of the host electronic blackboard 20 corresponding to the remote operation processing unit 83), and determines the order of displaying images in the remote sharing process based on the order of arrival of the images to the server 90 of the host electronic blackboard 2.

The remote operation processing unit 83 also refers to the participation site management table 820, and transmits the operation data to the client apparatuses 20 of all electronic blackboards 2 participating in the remote sharing process (including the client apparatus 20 of the host electronic blackboard 20 corresponding to the remote operation processing unit 83). The remote operation processing unit 83 further receives from the corresponding client apparatus 20 the notification data indicating the completion of the storage of the image data, and transmits the notification data to the other client apparatuses 20. The data transmitted and received herein may be described in the javascript object notation (JSON) format or the extensible markup language (XML) format.

An example of the notification data item for the image data item will now be described with reference to FIG. 7.

In FIG. 7, "to," "from," and "origin" include address data, transmitter data, and generator data, respectively, which may be described in universally unique identifier (UUID) (RFC 4122), IP address, uniform resource identifier (URI) (RFC 2396), URL (RFC 1738), or extensible messaging and presence protocol (XMPP) address (RFC 6122).

Further, "type" represents the data type; "stroke" represents the stroke data and "media" represents the notification data of the image, and "sequence" represents the sequence number uniquely identifying the message. Further, "method" includes "add (i.e., render)," "remove," and "update." Furthermore, "id" represents the ID of the stroke data, "url" represents the position data (URL) of the divided file for the image, and "parent" represents the ID of a parent element (page). The notification data may also include "references" representing the sequence number to be referred to and "points" representing the coordinate string of the stroke data, for example.

The operation composition unit 84 combines the operation data of the respective electronic blackboards 2 output from the remote operation processing unit 83, stores the combined operation data in the operation data storage unit 840, and returns the operation data to the remote operation processing unit 83. The remote operation transmission unit 76 transmits the operation data to the client apparatus 20 of the host electronic blackboard 2 and the client apparatuses 20 of the participant electronic blackboards 2, thereby displaying the image based on the same operation data on the respective electronic blackboards 2.

The operation composition unit 84 combines the operation data in order of input of the operation data thereto. Therefore, the stroke image IB is displayed on the displays 3 of the electronic blackboards 2 installed at all sites participating in the remote sharing process in order of strokes made by the respective users of the electronic blackboards 2, unless the communication network 9 is busy.

The page processing unit 85 has functions similar to those of the page processing unit 37 of the image processing unit 30 in the client apparatus 20. Thus, the foregoing page data is also stored in the page data storage unit 850 of the server 90. The page data storage unit 850 is similar in configuration to the foregoing page data storage unit 300 of the image processing unit 30, and thus description thereof will be omitted.

Operations performed by the electronic blackboard 2 as an example of the image processing apparatus according to the present embodiment will now be described with reference to FIGS. 8 and 9.

Figure 8:
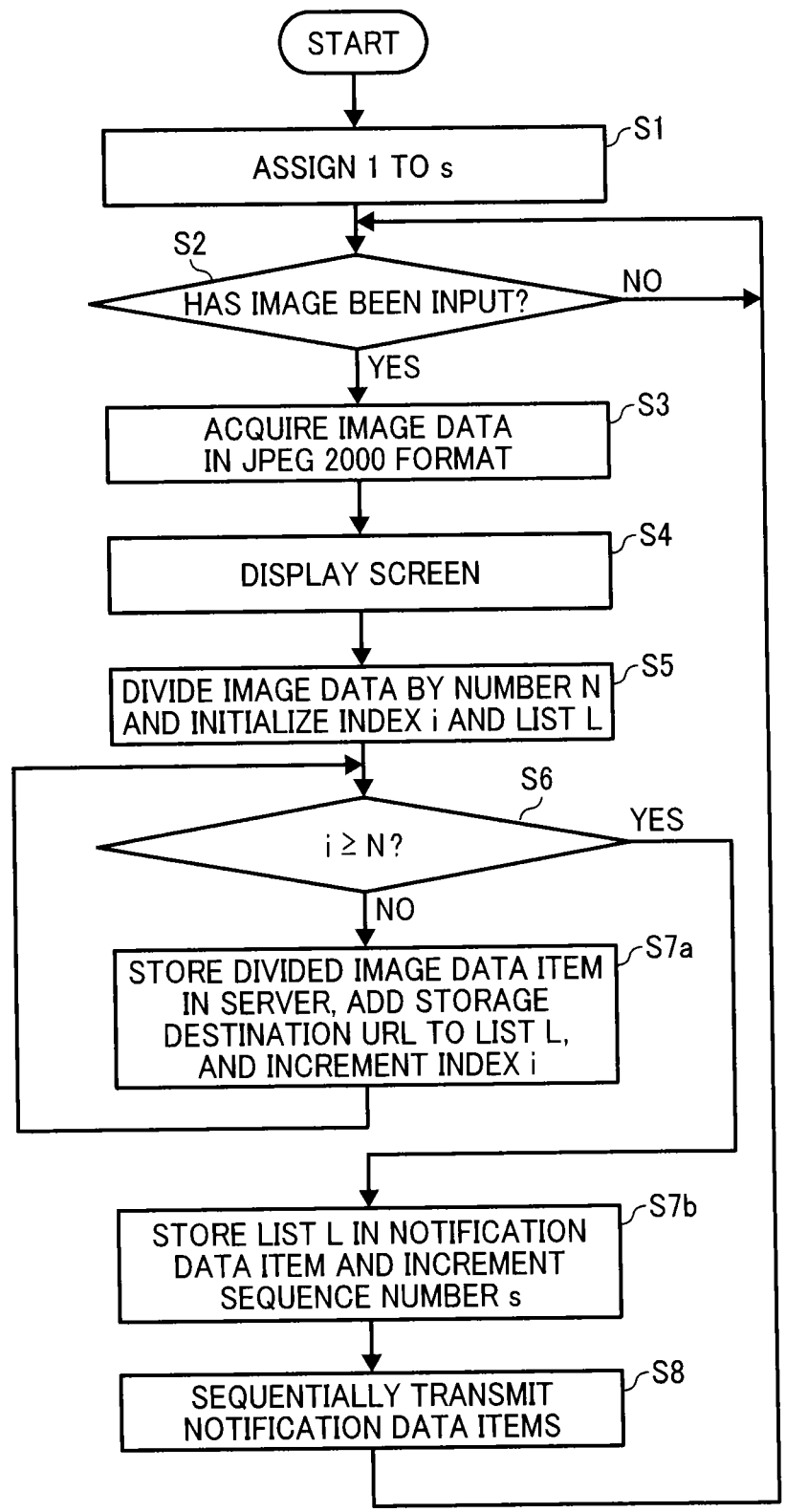
FIG. 8 is a flowchart illustrating a first operation performed by the electronic blackboards when serving as an image transmitter.

FIG. 8 is a flowchart illustrating a first operation performed by the electronic blackboard 2 when serving as an image transmitter. FIG. 9 is a flowchart illustrating a second operation performed by the electronic blackboard 2 when serving as an image receiver.

In the first operation illustrated in FIG. 8, the notification data generation unit 31b initializes a sequence number s for the notification data as illustrated in FIG. 7 by assigning 1 thereto (step S1). Then, the video acquisition unit 21 detects whether or not any image has been input from the laptop PC 6 (step S2). If an image has been input from the laptop PC 6 (YES at step S2), the procedure proceeds to step S3, and the image acquisition unit 31 acquires the image data (i.e., the output image IC) in order conforming to the JPEG 2000 format and stores the image data in the RAM 103 (step S3).

The image acquisition unit 31 then reads the image data at video rate from the RAM 103 and outputs the image data to the display composition unit 36. Then, the video composition unit 28 displays a screen on the display 3 via the display composition unit 36 (step S4).

After the screen is displayed, the image dividing unit 31a divides the image data (i.e., the output image IC) stored in the RAM 103 by a partition number N, and initializes an image data index i and a divided image list L (step S5). The divided image list L includes a data table for storing data, in which the position data items corresponding to the divided image data items are described in the following process.

Herein, the image dividing unit 31a may calculate the partition number N from the following expression (1) based on the file size (KB) of the image data and a division size of 10 KB.

$$N = \text{file size}/10 \qquad (1)$$

At step S5, the image dividing unit 31a divides the image data (i.e., the output image IC) by the partition number N to generate divided image files respectively including the divided image data items, and stores the divided image files in the divided image list L.

When the image data in the JPEG 2000 format is divided, the image data gradually shifts from rough information of the entire screen to finer information. Therefore, the image data may be divided at borders of blocks in each of layers such that each divided image data item is composed of blocks of image data not exceeding the division size, and the address of the divided image data item in the divided image file may be indicated by the position data item.

Alternatively, if the image data in the JPEG 2000 format is divided based on the resolution, the image data may be divided at borders of blocks based on the resolution such that each divided image data item is composed of blocks of image data not exceeding the division size, and the address of the divided image data item in the divided image file may be indicated by the position data item.

The divided image data items are thus readily generated based on the block units of image data included in the image frame conforming to the JPEG 2000 standard, thereby reducing the processing load on the transmitter.

Thereafter, the image dividing unit 31a determines whether or not the image data index i is less than the partition number N, i.e., whether or not the image data is still being processed (step S6). If the image data index i is less than the partition number N, i.e., the image data is still being processed (NO at step S6), the image dividing unit 31a transmits the divided image data item corresponding to the image data index i to the remote image processing unit 82 of the server 90 via the remote image transmission unit 63 and the remote image reception unit 73 (step S7a).

The remote image processing unit 82 of the server 90 stores the divided image data item received from the image dividing unit 31a in the image data management unit 830. The remote image processing unit 82 also extracts the storage destination URL (i.e., position data) of the divided image data item from the image data management unit 830, and transmits the storage destination URL (i.e., position data) to the image acquisition unit 31 via the remote image reception unit 73 and the remote image transmission unit 63.

The image dividing unit 31a then adds the storage destination URL (i.e., position data) to the divided image list L, and increments the image data index i by 1. The procedure then returns to step S6. Consequently, the N number of position data items corresponding to the divided image data items is given in the divided image list L.

If the image data index i equals or exceeds the partition number N (YES at step S6), the image dividing unit 31a causes the notification data generation unit 31b to store the divided image list L in each of the notification data items, adds the sequence number s to the notification data item, and increments the sequence number s by 1 (step S7b).

Thereafter, the server 90 receives the notification data items via the remote operation reception unit 75, and the remote operation processing unit 83 sequentially transmits the notification data items to the client apparatuses 20 installed at the other sites starting with the sequence number 1 (step S8). In this step, the remote operation processing unit 83 transmits one notification data item for each divided image data item. The notification data item includes the divided image data item, the storage destination URL (i.e., position data) of the divided image data item, the divided image list L to which the divided image data item has been added, and the sequence number s uniquely assigned to the divided image data item. A configuration of the notification data item is illustrated in TABLE 1 given below.

TABLE 1

| divided image data item | storage destination URL (position data) | sequence number |
|---|---|---|
| 1 | | 1 |
| 2 | | 2 |
| 3 | | 3 |

After the transmission of the notification data items, the procedure returns to step S2 to wait for further image input (step S2). With the above-described operation, the image processing load on the transmitter is reduced.

Figure 9:
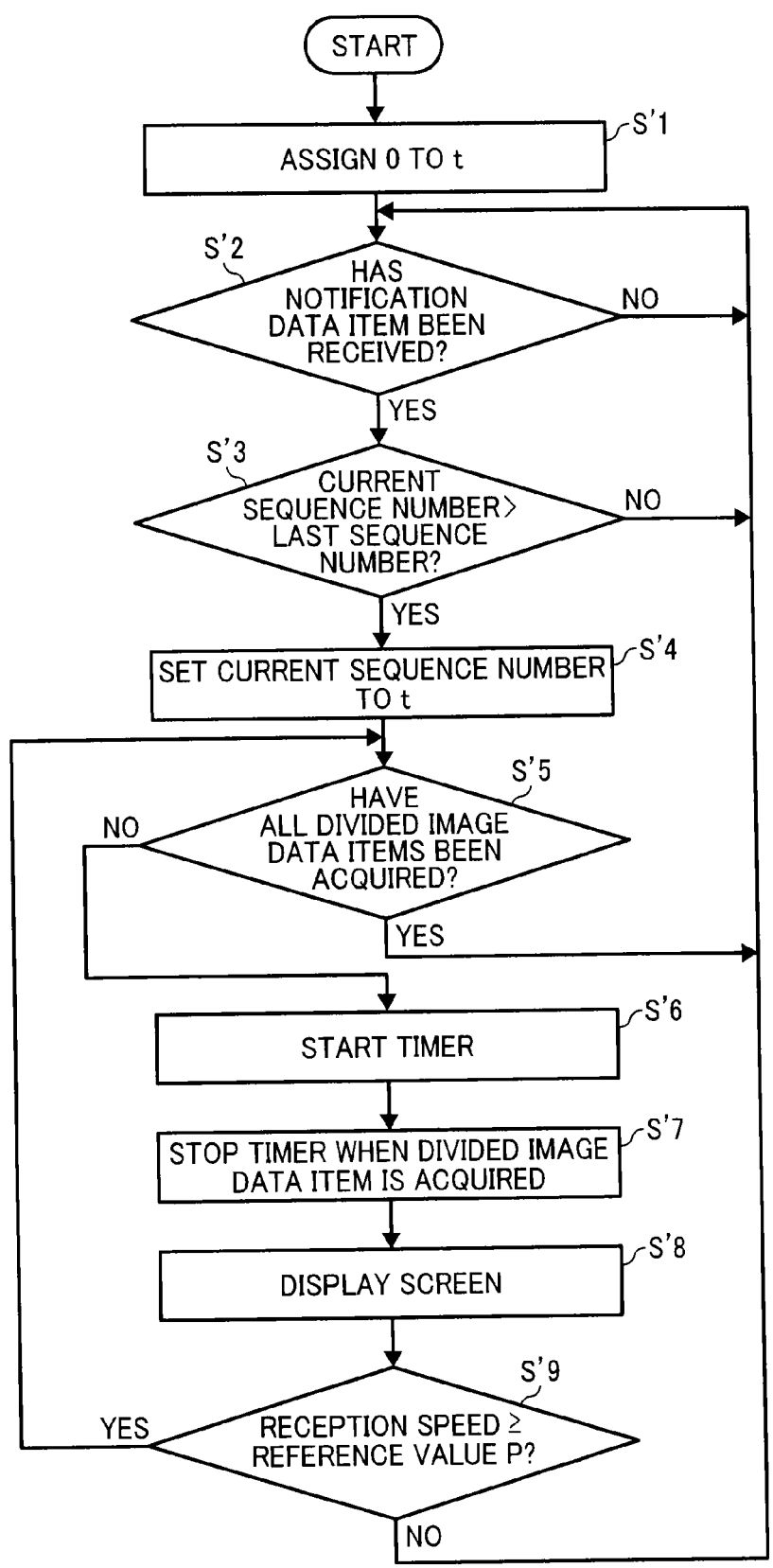
FIG. 9 is a flowchart illustrating a second operation performed by the electronic blackboards when serving as an image receiver.

In the second operation in FIG. 9 performed by the electronic blackboard 2 when serving as an image receiver, the remote operation reception unit 66 of the communication control unit 60 initializes a sequence number t for the notification data by assigning 0 thereto (step S'1). Then, the remote operation reception unit 66 determines whether or not any notification data item has been received via the communication network 9 (step S'2).

If a notification data item has been received via the communication network 9 (YES at step S'2), the communication control unit 60 stores in the RAM 103 the partition number N, the divided image data item, and the position data item added to the divided image list L included in the notification data item. The communication control unit 60 then determines whether or not the sequence number added to the notification data item received this time exceeds the sequence number of the notification data item received last time (step S'3).

If the current sequence number exceeds the last sequence number (YES at step S'3), the communication control unit 60 sets the current sequence number in the sequence number t (step S'4). Thereafter, the communication control unit 60 determines whether or not all divided image data items included in the above-described notification data items have been acquired, i.e., whether or not the sequence number t received this time has reached the partition number N (step S'5).

If all divided image data items included in the notification data items have been acquired (YES at step S'5), the procedure returns to step S'2 to wait for another notification data item (step S'2). If not all divided image data items included in the notification data items have been acquired, i.e., the sequence number t received this time has not reached the partition number N (NO at step S'5), the communication control unit 60 starts timing with a timer (step S'6).

The communication control unit 60 then stops the timer upon acquiring the divided image data item from the notification data item received this time (step S'7). Thereafter, the communication control unit 60 transmits the acquired divided image data item and position data item to the image processing unit 30, and the video composition unit 28 displays a screen on the display 3 via the display composition unit 36 of the image processing unit 30 (step S'8). That is, the image processing unit 30 develops the divided image data items in order of receipt of the divided image data items based on the divided image data item included in the notification data item received this time, thereby reproducing and displaying the image data on the display 3.

Then, the communication control unit 60 calculates a reception speed R (bps) from the following expression (2) based on a time u (seconds) measured by the timer (i.e., the time taken for the acquisition of the file) and the file size (bytes).

$$R = 8 \cdot \text{file size}/u \quad (2)$$

The communication control unit 60 determines whether or not the reception speed R is less than a reference value P (kbps) (step S'9). The reference value P may be set to 100 (kbps). If the reception speed R reaches or exceeds the reference value P (YES at step S'9), the procedure returns to step S'5 to determine whether or not all divided image data items have been acquired (step S'5). If the reception speed R has not reached the reference value P (NO at step S'9), the procedure returns to step S'2 to wait for another notification data item (step S'2).

Data transmission between the electronic blackboards 2a and 2b as examples of the image processing apparatus according to the present embodiment will now be described with reference to FIG. 10.

Figure 10:
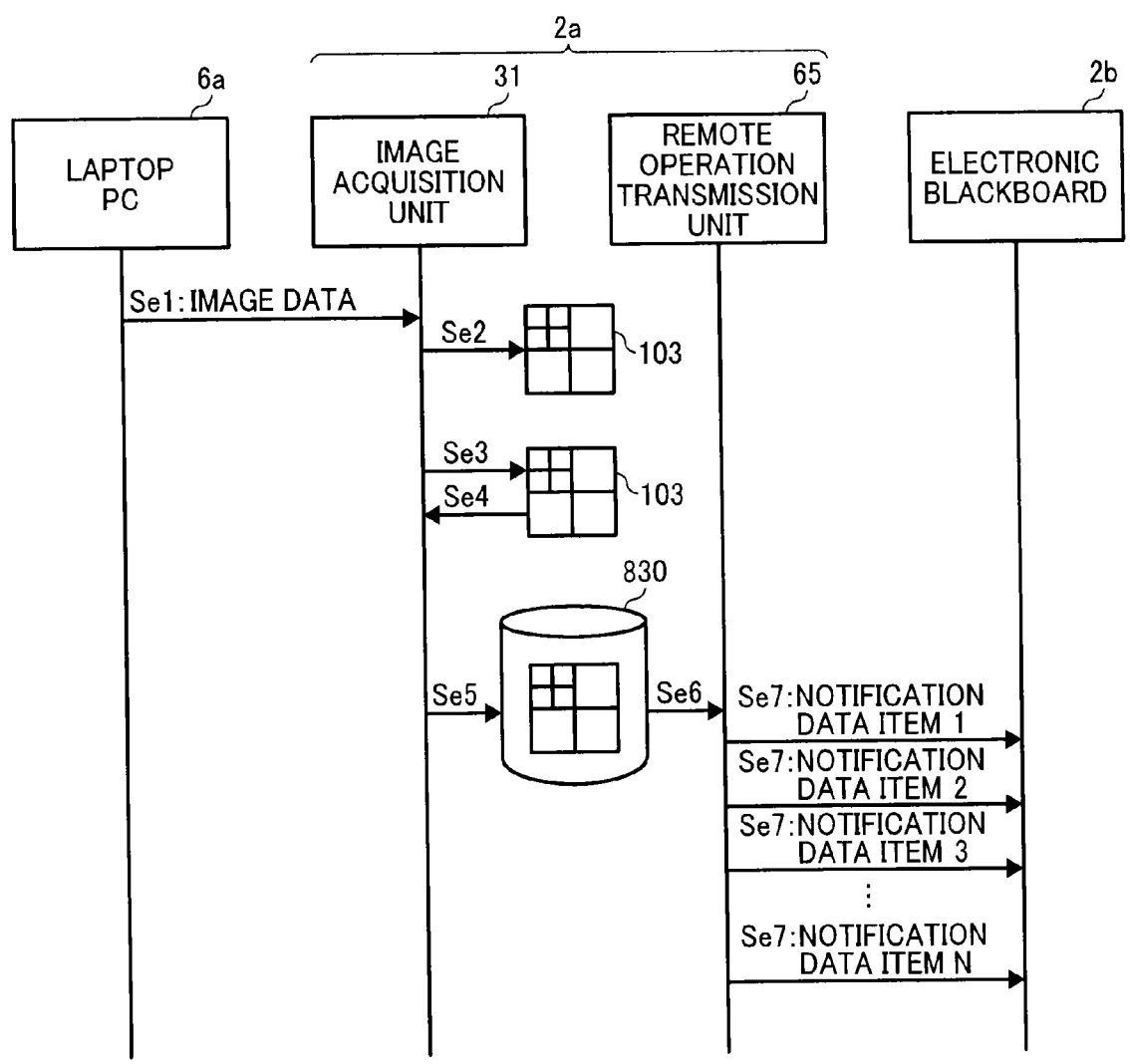
FIG. 10 is a sequence diagram illustrating data transmission between the electronic blackboards as examples of an image processing apparatus according to an embodiment of this disclosure.

As illustrated in FIG. 10, the image data output from the laptop PC 6a is transmitted to the image acquisition unit 31 of the electronic blackboard 2a (step Se1), and the image acquisition unit 31 stores the image data in the RAM 103 (step Se2).

Then, the image acquisition unit 31 (specifically, the image dividing unit 31a) divides the image data stored in the RAM 103 by the partition number N, i.e., reads the image data to be divided as divided image data items (steps Se3 and Se4), and sequentially transmits the divided image data items to the image data management unit 830 as the image division proceeds (step Se5). The image dividing unit 31a repeats steps Se3 to Se5 until all divided image data items divided by the partition number N are transmitted.

Then, the remote operation processing unit 83 reads a notification data item 1 from the image data management unit 830 (step Se6), and transmits the notification data item 1 to the electronic blackboard 2b via the communication network 9 (step Se7). The remote operation processing unit 83 repeats steps Se6 and Se7 by sequentially transmitting the notification data items from the sequence number 1 of the notification data item 1, until all notification data items 1 to N respectively including the divided image data items divided by the partition number N are transmitted.

In the second operation according to the present embodiment, the electronic blackboard 2 serving as the image receiver is configured to receive the divided image data items included in all notification data items transmitted from the electronic blackboard 2 serving as the image transmitter. However, this disclosure is not limited to this configuration. Thus, the number of divided image data items received by the electronic blackboard 2 serving as the receiver may be changed depending on the size of the display area allocatable to the display 3 of the electronic blackboard 2 or the number of divided image data items required by the electronic blackboard 2.

As described above, the electronic blackboard 2 serving as the transmitter acquires high-quality, high-resolution image data in the JPEG 2000 format irrespective of the status of the electronic blackboard 2 serving as the receiver, and dividedly stores the acquired image data, while the electronic blackboard 2 serving as the receiver acquires and combines, in accordance with the status thereof, the divided image data items from the storage destination URLs (i.e., position data items) included in the notification data items, and progressively displays the image.

Further, since the electronic blackboard 2 serving as the transmitter generates and dividedly stores the JPEG 2000-formatted image, and sequentially transmits the divided image data items and the position data items to the electronic blackboard 2 serving as the receiver, the electronic blackboard 2 serving as the receiver sequentially receives the divided image data items in accordance with the communication status thereof. Accordingly, the electronic blackboard 2 serving as the receiver is capable of displaying the divided image data items as the divided image data item arrive, thereby progressively displaying the image while checking the image receiving process.

Moreover, since the image data is reproduced with the divided image data items developed in order of receipt at the respective positions specified by the position data items, the electronic blackboard 2 serving as the receiver is capable of reproducing the image data even if the resolution of the electronic blackboard 2 is different from that of the electronic blackboard 2 serving as the transmitter.

A second embodiment of this disclosure will now be described. Operations of the electronic blackboard 2 as an example of an image processing apparatus according to the second embodiment will be described with reference to FIG. 11.

Figure 11:
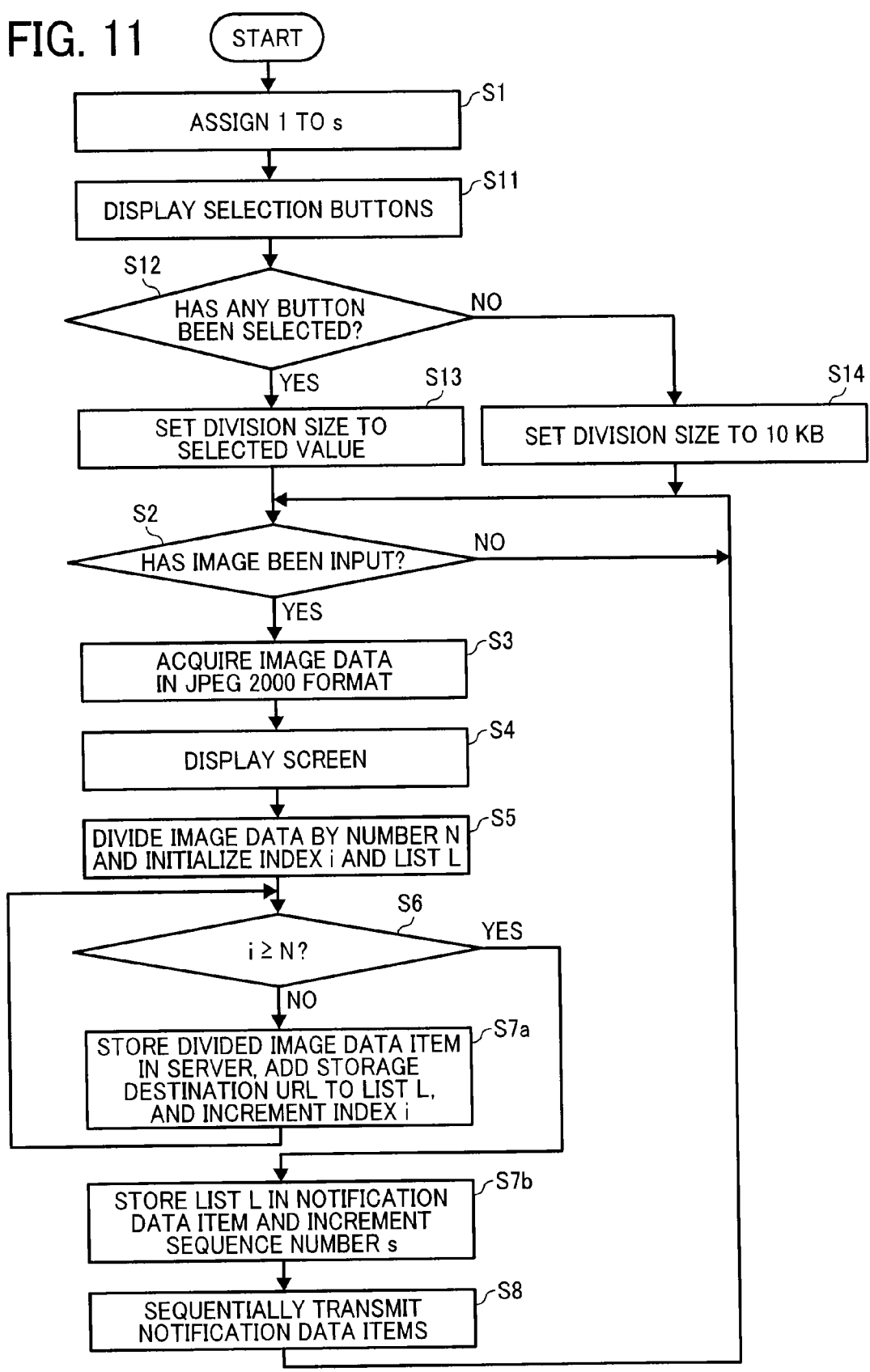
FIG. 11 is a flowchart illustrating a third operation performed by the electronic blackboards when serving as an image transmitter according to a second embodiment of this disclosure.

FIG. 11 is a flowchart illustrating a third operation performed by the electronic blackboard 2 when serving as an image transmitter, in which the division size is specified by a user. In FIG. 11, steps similar to those of FIG. 8 are designated by the same reference numerals, and description thereof will be omitted.

Figure 12:
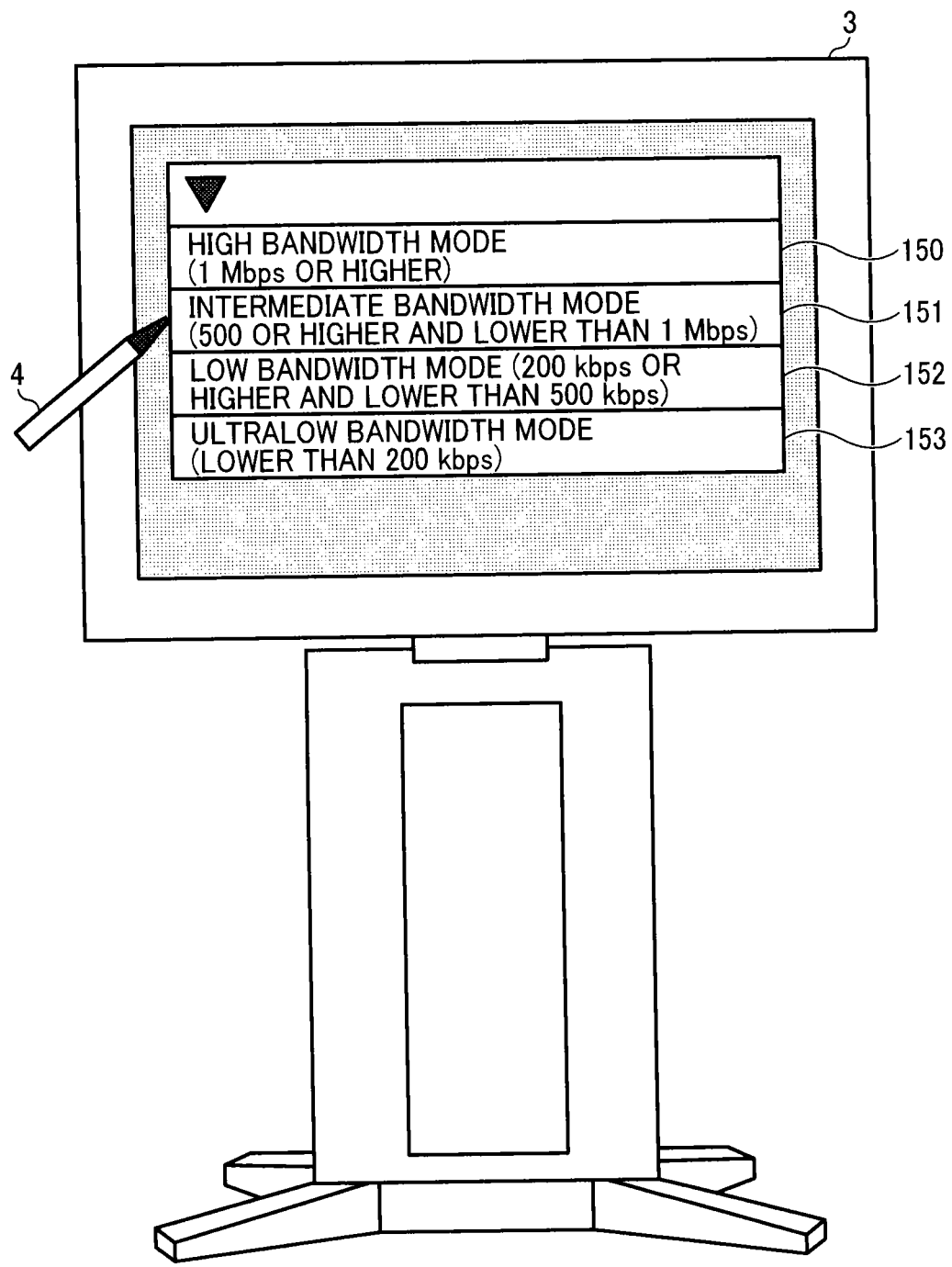
FIG. 12 is a diagram illustrating an example of selection buttons on a display for selecting a bandwidth mode and a corresponding division size.

In the third operation illustrated in FIG. 11, the notification data generation unit 31b initializes the sequence number s for the notification data by assigning 1 thereto (step S1). Then, the operation processing unit 26 displays selection buttons for specifying the division size corresponding to the bandwidth mode on the display 3 (step S11). As illustrated in FIG. 12, the selection buttons include a high bandwidth mode (1 Mbps or higher) button 150, an intermediate bandwidth mode (500 kbps or higher and lower than 1 Mbps) button 151, a low bandwidth mode (200 kbps or higher and lower than 500 kbps) button 152, and an ultralow bandwidth mode (lower than 200 kbps) button 153.

Then, the event processing unit 25 determines whether or not any of the bandwidth mode buttons 150 to 153 for specifying the division size has been touched (step S12). If the division size has been specified (YES at step S12), the image dividing unit 31a sets the division size to the value corresponding to the selected one of the bandwidth mode buttons 150 to 153 (step S13).

For example, with reference to TABLE 2 given below, the division size may be set to 100 KB when the high bandwidth mode is selected, 50 KB when the intermediate bandwidth mode is selected, 25 KB when the low bandwidth mode is selected, and 10 KB when the ultralow bandwidth mode is selected. Thereafter, the procedure then proceeds to step S2.

TABLE 2

| | bandwidth mode | | | |
| --- | --- | --- | --- | --- |
| | high bandwidth mode | intermediate bandwidth mode | low bandwidth mode | ultralow bandwidth mode |
| division size | 100 KB | 50 KB | 25 KB | 10 KB |

If no division size is selected, i.e., unspecified (NO at step S12), the image dividing unit 31a sets the division size to a default value (10 KB in the present embodiment) (step S14). Since the image data is thus divided based on a predetermined division size if no communication bandwidth is selected, divided image data items of the predetermined division size are generated. Thereafter, the procedure then proceeds to step S2.

Step S2 and the subsequent steps are similar to steps S2 to S8 illustrated in FIG. 8, and thus description thereof will be omitted.

A fourth operation according to the second embodiment performed by the electronic blackboard 2 serving as an image receiver is similar to the second operation according to the first embodiment illustrated in the flowchart of FIG. 9, and thus description thereof will be omitted.

As described above, the present embodiment allows the image data to be divided based on the division size corresponding to the selected communication bandwidth, thereby generating divided image data items of the division size suitable for the communication bandwidth.

Further, the present embodiment allows the division size to be specified as desired. It is therefore possible to increase the division size when a high communication bandwidth is used between the remote sites, and thus reduce communication overhead (i.e., extra time required for communication). Accordingly, the image is transmitted from one site to another site with less delay, enhancing user convenience.

Embodiment examples of this disclosure and effects thereof will be summarized.

According to a first example, the information sharing system 1 includes the electronic blackboard 2a and the electronic blackboard 2b connected to the electronic blackboard 2a via the communication network 9. The electronic blackboard 2a includes the video acquisition unit 21 that inputs image data, the image dividing unit 31a that divides the image data to generate divided image data items, the image data management unit 830 that stores the divided image data items at respective storage destinations and outputs position data items indicating the respective storage destinations of the divided image data items, the notification data generation unit 31b that generates notification data items each including a corresponding divided image data item and a corresponding position data item acquired from the image data management unit 830, and the remote operation processing unit 83 that sequentially transmits the notification data items to the electronic blackboard 2b. The electronic blackboard 2b includes the remote operation reception unit 66 that receives the notification data items from the electronic blackboard 2a and the image processing unit 30 that reproduces the image data by developing the divided image data items in order of receipt of the divided image data items based on the divided image files included in the notification data items.

According to the present example, the image processing load on the electronic blackboard 2a is reduced. Further, with the divided image data items sequentially developed in order of receipt thereof, the image data is reproduced even if the electronic blackboard 2b has a resolution different from that of the electronic blackboard 2a.

According to a second example, the electronic blackboard 2a further includes the event processing unit 25 that selects one of a plurality of communication bandwidths. The image dividing unit 31a acquires a division size corresponding to the selected communication bandwidth, and divides the image data based on the division size.

According to the present example, the image data is divided based on the division size corresponding to the selected communication bandwidth, thereby generating the divided image data items of the division size suitable for the communication bandwidth.

According to a third example, the image dividing unit 31a of the electronic blackboard 2a divides the image data based on a predetermined division size if no communication bandwidth is selected by the event processing unit 25.

According to the present example, the image data is divided based on the predetermined division size if no communication bandwidth is selected, thereby generating the divided image data items of the predetermined division size.

According to a fourth example, the video acquisition unit 21 of the electronic blackboard 2a inputs image data of an image frame conforming to the JPEG 2000 standard.

According to the present example, the divided image data items are readily generated from block units of image data included in the image frame conforming to the JPEG 2000 standard, thereby reducing the processing load on the electronic blackboard 2a.

According to a fifth example, the electronic blackboard 2a includes the video acquisition unit 21 that inputs image data, the image dividing unit 31a that divides the image data to generate divided image data items, the image data management unit 830 that stores the divided image data items at respective storage destinations and outputs position data items indicating the respective storage destinations of the divided image data items, the notification data generation unit 31b that generates notification data items each including a corresponding divided image data item and a corresponding position data item acquired from the image data management unit 830, and the remote operation processing unit 83 that sequentially transmits the notification data items to the electronic blackboard 2b.

According to the present example, the image processing load on the electronic blackboard 2a is reduced.

According to a sixth example, the electronic blackboard 2a further includes the event processing unit 25 that selects one of a plurality of communication bandwidths. The image dividing unit 31a acquires a division size corresponding to the selected communication bandwidth, and divides the image data based on the division size.

According to the present example, the image data is divided based on the division size corresponding to the selected communication bandwidth, thereby generating the divided image data items of the division size suitable for the communication bandwidth.

According to a seventh example, the image dividing unit 31a divides the image data based on a predetermined division size if no communication bandwidth is selected by the event processing unit 25.

According to the present example, the image data is divided based on the predetermined division size if no communication bandwidth is selected, thereby generating the divided image data items of the predetermined division size.

According to an eighth example, the video acquisition unit 21 inputs image data of an image frame conforming to the JPEG 2000 standard.

According to the present example, the divided image data items are readily generated from block units of image data included in the image frame conforming to the JPEG 2000 standard, thereby reducing the processing load on the electronic blackboard 2a.

According to a ninth example, an image processing method includes inputting image data (step S2), dividing the image data to generate divided image data items (step S5), storing the divided image data items at respective storage destinations in the image data management unit 830 and outputting the position data items indicating the respective storage destinations of the divided image data items (step S7a), generating the notification data items each including a corresponding divided image data item and a corresponding position data item acquired from the image data management unit 830 (step S7b), and sequentially transmitting the notification data items to a counterpart electronic blackboard 2b (step S8) to cause the electronic blackboard 2b to reproduce the image data by developing the divided image data items in order of receipt of the divided image data items based on the divided image data items and the position data items included in the notification data items.

According to the present example, the image processing load on the electronic blackboard 2a in the transmission of the image data is reduced. Further, with the divided image data items sequentially developed in order of receipt thereof, the image data is reproduced even if the electronic blackboard 2b has a resolution different from that of the electronic blackboard 2a.

An information sharing system, an image processing apparatus, and an image processing method according to embodiments of this disclosure are capable of reducing the image processing load on an image processing apparatus that transmits image data.

The above-described embodiments are illustrative and do not limit this disclosure. Thus, numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. Further, the above-described steps are not limited to the order disclosed herein. It is therefore to be understood that, within the scope of the appended claims, this disclosure may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

This disclosure can be implemented in any convenient form, for example using dedicated hardware, or a mixture of dedicated hardware and software. This disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since this disclosure can be implemented as software, each and every aspect of this disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information sharing system, comprising:
a first image processing apparatus; and
a second image processing apparatus connected to the first image processing apparatus via a communication network,
wherein the first image processing apparatus includes:
an image capture device to input image data;
processing circuitry configured to divide the image data to generate divided image data items;
an image data memory to store the divided image data items at respective storage destinations and output position data items indicating the respective storage destinations of the divided image data items, wherein the processing circuitry is further configured to generate notification data items each including a corresponding position data item acquired from the image data memory, the corresponding position data item including a URL indicating a storage location of the corresponding divided image data item in the image data memory; and
a transmitter to sequentially transmit the notification data items to the second image processing apparatus without transmitting the corresponding divided image data items at a same time, wherein the corresponding divided image data items are new image data not previously transmitted to the second image processing apparatus, and
wherein the second image processing apparatus includes:
a receiver to receive the notification data items from the first image processing apparatus before receiving the corresponding divided image data items; and
a processor to reproduce the image data by acquiring and processing each divided image data item using each corresponding URL included in the notification data items at a desired timing in accordance with a status of the second image processing apparatus after receiving the notification data items.

2. The information sharing system of claim 1, wherein the processing circuitry is further configured to select one communication bandwidth of a plurality of communication bandwidths, acquire a division size corresponding to the one selected communication bandwidth, and divide the image data based on the acquired division size.

3. The information sharing system of claim 2, wherein the processing circuitry divides the image data based on a predetermined division size when no communication bandwidth is selected.

4. The information sharing system of claim 1, wherein the image capture device of the first image processing apparatus inputs the image data, which is an image frame conforming to a Joint Photographic Experts Group 2000 standard.

5. The information sharing system of claim 1, wherein the transmitter transmits one notification data item for each divided image data item.

6. The information sharing system of claim 1, wherein the processor of the second image processing apparatus is configured to sequentially process and display an image based on each divided image data item as each divided image data item is acquired, and before all image data items are acquired.

7. An image processing apparatus, comprising:
an image capture device to input image data;
processing circuitry configured to divide the image data to generate divided image data items;
an image data memory to store the divided image data items at respective storage destinations and output position data items indicating the respective storage destinations of the divided image data items, wherein the processing circuitry is further configured to generate notification data items each including a corresponding position data item acquired from the image data memory, the corresponding position data item including a URL indicating a storage location of the corresponding divided image data item in the image data memory; and
a transmitter to sequentially transmit the notification data items to a counterpart image processing apparatus via a communication network, without transmitting the corresponding divided image data items at a same time, wherein the corresponding divided image data items are new image data not previously transmitted to the counterpart image processing apparatus, to cause the counterpart image processing apparatus to receive the notification data items before receiving the corresponding divided image data items and to reproduce the image data by acquiring and processing each divided image data item using each corresponding URL included in the notification data items at a desired timing in accordance with a status of the second image processing apparatus after receiving the notification data items.

8. The image processing apparatus of claim 7, wherein the processing circuitry is further configured to select one communication bandwidth of a plurality of communication bandwidths, acquire a division size corresponding to the one selected communication bandwidth, and divide the image data based on the acquired division size.

9. The image processing apparatus of claim 8, wherein the processing circuitry divides the image data based on a predetermined division size when no communication bandwidth is selected.

10. The image processing apparatus of claim 7, wherein the image capture device inputs the image data, which is an image frame conforming to a Joint Photographic Experts Group 2000 standard.

11. An image processing method, comprising:
inputting image data;
dividing the image data to generate divided image data items;
storing the divided image data items at respective storage destinations in a memory;
outputting position data items indicating respective storage destinations of the divided image data items;
generating notification data items each including a corresponding position data item acquired from the memory, the corresponding position data item including a URL indicating a storage location of the corresponding divided image data item in the memory; and
sequentially transmitting the notification data items to a counterpart image processing apparatus via a communication network, without transmitting the corresponding divided image data items at a same time, wherein the corresponding divided image data items are new image data not previously transmitted to the counterpart image processing apparatus, to cause the counterpart image processing apparatus to receive the notification data items before receiving the corresponding divided image data items and to reproduce the image data by acquiring and processing each divided image data item using each corresponding URL included in the notification data items at a desired timing in accordance with a status of the second image processing apparatus after receiving the notification data items.

12. The method of claim 11, wherein the dividing step comprises selecting one communication bandwidth of a plurality of communication bandwidths, acquiring a division size corresponding to the selected one communication bandwidth, and dividing the image data based on the acquired division size.

13. The method of claim 11, wherein the inputting step comprises inputting the image data, which is an image frame conforming to a Joint Photographic Experts Group 2000 standard.

* * * * *